United States Patent
Mannheim Astete et al.

(10) Patent No.: US 11,813,821 B2
(45) Date of Patent: Nov. 14, 2023

(54) INVISIBLE EDGE SOLID SUBSTRATE COMPENSATION LAYER FOR AUTOMOTIVE GLAZING

(71) Applicant: AGP America S.A., Ciudad de Panama (PA)

(72) Inventors: Mario Arturo Mannheim Astete, Lima (PE); Juan Pablo Suarez, Lima (PE); Andres Fernando Sarmiento Santos, Lima (PE); Gonzalo Rafael Vizcarra Mendoza, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 16/768,613

(22) PCT Filed: Nov. 30, 2018

(86) PCT No.: PCT/IB2018/059534
§ 371 (c)(1),
(2) Date: May 29, 2020

(87) PCT Pub. No.: WO2019/106631
PCT Pub. Date: Jun. 6, 2019

(65) Prior Publication Data
US 2021/0078388 A1 Mar. 18, 2021

Related U.S. Application Data

(60) Provisional application No. 62/593,214, filed on Nov. 30, 2017.

(51) Int. Cl.
*B32B 3/24* (2006.01)
*B32B 17/10* (2006.01)
(Continued)

(52) U.S. Cl.
CPC ........ *B32B 17/10036* (2013.01); *B32B 3/266* (2013.01); *B32B 17/10045* (2013.01);
(Continued)

(58) Field of Classification Search
CPC ........... B60J 1/001; B60J 1/002; B32B 3/266; B32B 17/10036; B32B 17/10293;
(Continued)

(56) References Cited

U.S. PATENT DOCUMENTS 2,644,065 A * 6/1953 Peterson .................. H05B 1/02
219/547
2,676,117 A * 4/1954 Colbert ............... C03C 17/3655
313/635
(Continued)

FOREIGN PATENT DOCUMENTS

BE 806886 A * 5/1974 ....... B32B 17/10761
CN 202503691 U * 10/2012
(Continued)

OTHER PUBLICATIONS

Polycarbonate Data Sheet. Obtained from matweb.com on Apr. 7, 2021. (Year: 2021).*
(Continued)

*Primary Examiner* — Jeffrey A Vonch
(74) *Attorney, Agent, or Firm* — The Morales Law Firm; Joseph L. Morales

(57) ABSTRACT

Vehicle glazing, which once served just to provide for vision and protect from the elements, has been taking on new functions as the complexity and functionality of modern automobiles has evolved. Performance films and interlayers are often used to add to and enhance the functionality of laminates. These functions include solar control, sound dampening, head up display and variable light transmittance. Recent advances have made it possible to produce electronic
(Continued)

circuits on thin transparent substrates that are essentially invisible under normal lighting conditions. While these circuits can be inserted into the laminate and successfully laminated, the edges of the circuit insert are prone to objectionable aesthetics due to mismatch between the substrate and the interlayer index of refraction, thickness and color. The present invention compensates the edge of the solid insert by providing a sheet of a compatible compensation material that the substrate of the insert and which extends to at least the black band or the edge of glass of the laminate making the insert edge essentially invisible.

17 Claims, 2 Drawing Sheets

(51) Int. Cl.
*B60J 1/00* (2006.01)
*B32B 3/26* (2006.01)
*B60K 35/00* (2006.01)
*B60S 1/02* (2006.01)

(52) U.S. Cl.
CPC .. *B32B 17/10174* (2013.01); *B32B 17/10293* (2013.01); *B32B 17/10541* (2013.01); *B32B 17/10752* (2013.01); *B32B 17/10761* (2013.01); *B60J 1/001* (2013.01); *B60J 1/002* (2013.01); *B60K 35/00* (2013.01); *B60S 1/026* (2013.01); *B32B 2605/006* (2013.01); *B60K 2370/143* (2019.05); *B60K 2370/152* (2019.05); *B60K 2370/785* (2019.05)

(58) Field of Classification Search
CPC ........ B32B 17/10541; B32B 17/10752; B32B 17/10761; B32B 2605/006; B60K 2370/143; B60K 2370/152; B60K 2370/785; Y10T 428/24273; Y10T 428/24331; Y10T 428/24752; Y10T 428/24802; Y10T 428/24851; Y10T 428/24926
USPC ............. 428/131, 137, 189, 195.1, 201, 210
See application file for complete search history.

(56) References Cited

U.S. PATENT DOCUMENTS

| | | | | |
|---|---|---|---|---|
| 3,317,906 A * | 5/1967 | Baldridge | ......... | B32B 17/10036 250/488.1 |
| 3,597,050 A * | 8/1971 | Plumat | ..................... | B60J 1/002 359/580 |
| 3,790,752 A * | 2/1974 | Boaz | ........................ | H05B 3/86 219/541 |
| 4,100,398 A | 7/1978 | Levin | | |
| 4,242,403 A * | 12/1980 | Mattimoe | .......... | B32B 17/10018 428/483 |
| 4,249,958 A * | 2/1981 | Baudin | ............. | B32B 17/10761 156/286 |
| 4,645,970 A * | 2/1987 | Murphy | ............ | B32B 17/10192 40/544 |
| 4,749,261 A * | 6/1988 | McLaughlin | ..... | B32B 17/10018 349/104 |
| 4,842,389 A * | 6/1989 | Wood | ................ | B32B 17/10036 156/99 |
| 4,899,507 A * | 2/1990 | Mairlot | ............ | B32B 17/10036 52/204.5 |
| 4,964,365 A * | 10/1990 | D'Amato | ................ | H05K 3/068 118/426 |
| 4,968,895 A * | 11/1990 | Leclercq | ............. | B60Q 1/1423 315/149 |
| 5,005,020 A * | 4/1991 | Ogawa | ............... | B32B 17/10036 343/713 |
| 5,028,287 A * | 7/1991 | Herliczek | ......... | B32B 17/10761 156/289 |
| 5,137,954 A * | 8/1992 | DasGupta | ......... | B32B 17/10761 524/297 |
| 5,208,080 A * | 5/1993 | Gajewski | .......... | B32B 17/10036 428/56 |
| 5,436,060 A * | 7/1995 | Saurer | ............... | B32B 17/10036 428/34.4 |
| 5,620,799 A * | 4/1997 | Sauer | ................... | H01Q 1/1271 52/173.3 |
| 5,622,580 A * | 4/1997 | Mannheim | ........ | B32B 17/10743 100/295 |
| 5,648,785 A * | 7/1997 | Nagy | ..................... | H01Q 13/16 343/906 |
| 5,898,407 A * | 4/1999 | Paulus | .............. | B32B 17/10036 343/713 |
| 6,242,088 B1 * | 6/2001 | Costa | ................. | B32B 17/10963 428/339 |
| 6,261,398 B1 * | 7/2001 | Costa | ................ | B32B 17/10889 156/286 |
| 6,275,157 B1 * | 8/2001 | Mays | ..................... | G07C 5/085 340/572.5 |
| 6,280,547 B1 * | 8/2001 | Balduin | ............ | B32B 17/10761 156/286 |
| 6,313,796 B1 * | 11/2001 | Potin | ................. | B32B 17/10036 343/700 MS |
| 6,339,384 B1 * | 1/2002 | Valdes-Rodriguez | | ...................... G08G 1/0175 340/928 |
| 6,352,754 B1 * | 3/2002 | Frost | ................. | B32B 17/10174 52/173.3 |
| 6,356,236 B1 * | 3/2002 | Maeuser | .......... | B32B 17/10761 343/873 |
| 6,410,120 B1 * | 6/2002 | Frost | ......................... | B32B 1/00 428/209 |
| 6,495,261 B1 * | 12/2002 | Gagliardi | .......... | B32B 17/10018 296/84.1 |
| 6,559,419 B1 * | 5/2003 | Sol | ............................ | H05B 3/86 52/171.2 |
| 6,765,177 B2 * | 7/2004 | Noguchi | ................... | H05B 3/86 219/203 |
| 6,787,005 B2 * | 9/2004 | Laird | ................... | C03C 17/3423 204/192.27 |
| 6,808,797 B1 * | 10/2004 | Bordeaux | ......... | B32B 17/10165 428/480 |
| 7,019,260 B1 * | 3/2006 | Degand | ............. | B32B 17/10761 219/203 |
| 7,034,326 B2 * | 4/2006 | Noguchi | ............... | B60S 1/0881 219/203 |
| 7,379,028 B2 * | 5/2008 | Hisaeda | ............... | H01Q 1/1271 219/203 |
| 8,077,100 B2 * | 12/2011 | Baranski | ......... | B32B 17/10761 343/711 |
| 10,525,796 B2 * | 1/2020 | Sawada | ............... | B60H 1/3421 |
| 10,562,274 B1 * | 2/2020 | Kingman | .......... | B32B 17/10036 |
| 10,960,646 B2 * | 3/2021 | Kagaya | ............... | B32B 7/12 |
| 2002/0039649 A1* | 4/2002 | Nagai | ...................... | B60J 1/002 428/328 |
| 2002/0068167 A1* | 6/2002 | Veerasamy | ............. | C23C 14/08 204/192.27 |
| 2002/0094407 A1* | 7/2002 | Frost | .................. | B32B 17/10981 428/77 |
| 2003/0111160 A1* | 6/2003 | Bolognese | ........ | B32B 17/10761 156/100 |
| 2003/0148114 A1* | 8/2003 | Bourcier | ........... | B32B 17/10871 428/432 |
| 2003/0159504 A1 | 8/2003 | Barguirdjian et al. | | |
| 2003/0232197 A1* | 12/2003 | Disteldorf | ............... | C03C 17/36 428/411.1 |
| 2004/0026397 A1* | 2/2004 | Degand | ............... | C03C 17/3652 219/203 |
| 2004/0160688 A1* | 8/2004 | Noguchi | ............... | B32B 17/1066 359/879 |

(56) References Cited

U.S. PATENT DOCUMENTS

| | | | |
|---|---|---|---|
| 2004/0200821 A1* | 10/2004 | Voeltzel | H05B 3/86 219/203 |
| 2005/0084659 A1 | 4/2005 | Dunkel | |
| 2006/0156652 A1* | 7/2006 | Roquiny | C03C 17/006 52/204.5 |
| 2006/0208904 A1* | 9/2006 | Ohara | H01Q 1/2208 343/873 |
| 2006/0208905 A1* | 9/2006 | Ohara | B32B 17/10293 343/873 |
| 2006/0208906 A1* | 9/2006 | Kokuryo | B32B 17/10761 343/873 |
| 2006/0208907 A1* | 9/2006 | Kokuryo | B32B 17/10036 343/873 |
| 2006/0275599 A1* | 12/2006 | Lefevre | B32B 17/10018 428/332 |
| 2007/0020442 A1* | 1/2007 | Giron | B60R 1/088 428/192 |
| 2007/0029026 A1* | 2/2007 | Bolognese | B32B 17/10165 156/99 |
| 2007/0036956 A1* | 2/2007 | Chen | B32B 17/10761 428/524 |
| 2007/0052522 A1* | 3/2007 | Kokuryo | B60J 1/02 340/10.1 |
| 2007/0090092 A1* | 4/2007 | Forstner | C03C 23/006 427/532 |
| 2007/0154705 A1* | 7/2007 | Doeppner | B32B 17/10541 156/99 |
| 2007/0187382 A1* | 8/2007 | Mauser | H05B 3/84 219/203 |
| 2008/0129511 A1* | 6/2008 | Yuen | H01Q 1/2216 340/572.7 |
| 2009/0114928 A1* | 5/2009 | Messere | B32B 17/10559 257/E33.057 |
| 2009/0176101 A1 | 7/2009 | Greenall et al. | |
| 2009/0219468 A1* | 9/2009 | Barton | B32B 17/10036 359/359 |
| 2009/0279004 A1* | 11/2009 | Greenall | B32B 17/10633 349/193 |
| 2010/0068532 A1* | 3/2010 | Fisher | B32B 17/10688 428/426 |
| 2010/0165436 A1* | 7/2010 | Voss | B32B 17/10788 359/238 |
| 2010/0179725 A1 | 7/2010 | Boote et al. | |
| 2010/0215952 A1* | 8/2010 | Takamatsu | B32B 17/10036 428/339 |
| 2010/0255238 A1* | 10/2010 | Derda | B60S 1/0825 428/203 |
| 2010/0265041 A1* | 10/2010 | Almog | H01Q 1/2225 343/810 |
| 2010/0266832 A1* | 10/2010 | Derda | H05B 3/86 428/292.1 |
| 2010/0285280 A1* | 11/2010 | Yonekura | B32B 17/10788 428/174 |
| 2010/0285310 A1* | 11/2010 | Izutani | B32B 17/10889 156/99 |
| 2011/0025584 A1* | 2/2011 | Nishigasako | B32B 17/10541 345/76 |
| 2011/0027515 A1* | 2/2011 | Melcher | B32B 17/10339 428/134 |
| 2011/0073773 A1* | 3/2011 | Labrot | G02B 27/01 428/29 |
| 2011/0074643 A1* | 3/2011 | Baranski | H01Q 1/1271 343/712 |
| 2011/0097572 A1* | 4/2011 | Yonekura | B32B 17/10036 156/104 |
| 2011/0169705 A1* | 7/2011 | Goldberger | H01Q 1/325 65/102 |
| 2011/0199674 A1* | 8/2011 | Melcher | B32B 17/10633 359/359 |
| 2012/0288667 A1* | 11/2012 | Stjernman | B32B 27/00 428/131 |
| 2013/0017344 A1* | 1/2013 | Delsol | B05B 12/20 427/595 |
| 2013/0107191 A1* | 5/2013 | Tsai | G02B 5/208 349/193 |
| 2013/0236711 A1* | 9/2013 | Lu | B32B 17/10036 428/213 |
| 2013/0305912 A1* | 11/2013 | Weinhold | B32B 17/1077 89/36.02 |
| 2014/0327958 A1* | 11/2014 | Yoshimura | B32B 27/32 359/359 |
| 2014/0377580 A1* | 12/2014 | Manz | C03C 17/3652 428/457 |
| 2015/0013884 A1* | 1/2015 | Yeh | B23K 26/082 156/163 |
| 2015/0016132 A1* | 1/2015 | Verrat-Debailleul | B32B 17/10761 362/509 |
| 2015/0064374 A1* | 3/2015 | Jain | B32B 17/10018 156/60 |
| 2015/0101736 A1* | 4/2015 | Izutani | B32B 17/10761 156/104 |
| 2015/0125656 A1* | 5/2015 | Chen | B32B 7/022 428/141 |
| 2015/0140301 A1* | 5/2015 | Fisher | B32B 37/182 156/99 |
| 2015/0151611 A1* | 6/2015 | Gansen | H01Q 1/325 428/138 |
| 2015/0165965 A1 | 6/2015 | Masaki et al. | |
| 2015/0253486 A1* | 9/2015 | Verger | B32B 17/10541 362/606 |
| 2015/0303404 A1* | 10/2015 | Domercq | H10K 50/15 257/40 |
| 2015/0305148 A1* | 10/2015 | Czapka | G03B 15/03 361/736 |
| 2015/0343744 A1* | 12/2015 | Ogawa | B32B 17/10761 219/201 |
| 2016/0006112 A1* | 1/2016 | Kagaya | H01Q 9/16 343/712 |
| 2016/0075111 A1* | 3/2016 | Dixon | B32B 37/12 428/192 |
| 2016/0136930 A1* | 5/2016 | Gregard | B32B 17/10871 359/275 |
| 2016/0159282 A1* | 6/2016 | Kurihara | B60R 11/0235 348/148 |
| 2016/0207290 A1* | 7/2016 | Cleary | B32B 17/10146 |
| 2016/0214361 A1* | 7/2016 | Wakabayashi | B32B 17/10036 |
| 2016/0279904 A1* | 9/2016 | Sienerth | B32B 17/10119 |
| 2016/0297176 A1* | 10/2016 | Rickerl | B32B 37/06 |
| 2016/0332425 A1* | 11/2016 | Yamaguchi | B32B 27/306 |
| 2016/0347028 A1* | 12/2016 | Kosaka | B32B 3/266 |
| 2016/0347036 A1* | 12/2016 | Mellor | B32B 17/10761 |
| 2017/0050415 A1* | 2/2017 | Kanki | B32B 17/10036 |
| 2017/0129219 A1* | 5/2017 | Uebelacker | B60J 1/00 |
| 2017/0144413 A1* | 5/2017 | Yamamoto | B32B 27/08 |
| 2017/0174082 A1* | 6/2017 | Brandt | G02B 27/01 |
| 2017/0197561 A1* | 7/2017 | McFarland | B44C 5/0407 |
| 2017/0361576 A1* | 12/2017 | Legrand | B32B 17/10788 |
| 2018/0082669 A1* | 3/2018 | Lu | B32B 17/1055 |
| 2018/0111464 A1* | 4/2018 | Kong | B60J 10/34 |
| 2018/0162104 A1* | 6/2018 | Chamberlain | B32B 17/1022 |
| 2018/0222410 A1* | 8/2018 | Reul | B60J 1/17 |
| 2018/0281352 A1* | 10/2018 | Aoki | B32B 17/10348 |
| 2018/0370195 A1* | 12/2018 | Laluet | B32B 17/10045 |
| 2019/0009502 A1* | 1/2019 | Labrot | B32B 17/10568 |
| 2019/0022984 A1* | 1/2019 | Labrot | B32B 17/10201 |
| 2019/0022985 A1* | 1/2019 | Labrot | B32B 17/10788 |
| 2019/0030865 A1* | 1/2019 | Aoki | B32B 3/02 |
| 2019/0061481 A1* | 2/2019 | Kagaya | B32B 5/142 |
| 2019/0077704 A1* | 3/2019 | Frebourg | B60Q 1/0094 |
| 2019/0091971 A1* | 3/2019 | Klein | B32B 17/10174 |
| 2019/0134954 A1* | 5/2019 | Bauerle | B32B 17/10385 |
| 2019/0176438 A1* | 6/2019 | Klein | B32B 1/00 |
| 2019/0255813 A1* | 8/2019 | Bauerle | F21S 45/50 |
| 2019/0263227 A1* | 8/2019 | Noda | B32B 17/10779 |
| 2019/0291388 A1* | 9/2019 | Bauerle | F21S 43/14 |
| 2019/0299752 A1* | 10/2019 | Sadakane | B32B 17/10348 |
| 2019/0366691 A1* | 12/2019 | Iwamoto | B32B 17/10743 |

(56) References Cited

U.S. PATENT DOCUMENTS

| | | | |
|---|---|---|---|
| 2020/0044284 A1* | 2/2020 | Fujino | H01M 4/366 |
| 2020/0130327 A1* | 4/2020 | Isomoto | B32B 27/06 |
| 2020/0156350 A1* | 5/2020 | Weber | B32B 1/00 |
| 2020/0193259 A1* | 6/2020 | Thangamani | G06K 19/07749 |
| 2020/0254730 A1* | 8/2020 | Schlögl | B32B 3/02 |
| 2020/0276792 A1* | 9/2020 | Laluet | B32B 17/10174 |
| 2021/0070019 A1* | 3/2021 | Mannheim Astete | B32B 17/1011 |
| 2021/0138766 A1* | 5/2021 | Klein | B32B 17/10495 |

FOREIGN PATENT DOCUMENTS

| | | | | |
|---|---|---|---|---|
| CN | 202806307 U | * | 3/2013 | |
| DE | 2248094 A1 | | 5/1973 | |
| DE | 4106958 A | * | 9/1992 | B32B 17/10889 |
| DE | 4212944 A1 | * | 10/1993 | B32B 17/10036 |
| DE | 19519504 A1 | * | 11/1996 | B32B 17/10036 |
| DE | 10002277 A1 | * | 8/2001 | B32B 17/10807 |
| DE | 10340856 A1 | * | 4/2005 | B29C 63/02 |
| DE | 102007012571 A1 | * | 1/2008 | B32B 17/10036 |
| DE | 102007039416 A1 | * | 2/2009 | B32B 27/08 |
| DE | 102008004049 A1 | * | 7/2009 | B32B 17/10036 |
| DE | 102008031770 A1 | * | 1/2010 | B32B 17/10036 |
| DE | 102010004443 A1 | * | 7/2011 | B60J 1/02 |
| DE | 102014208740 A1 | * | 11/2015 | B60K 35/00 |
| DE | 102015016281 A1 | * | 6/2017 | B32B 17/10036 |
| EP | 586296 A1 | * | 3/1994 | B32B 17/10 |
| EP | 2206601 A1 | * | 7/2010 | B32B 17/10009 |
| EP | 2955064 A1 | * | 12/2015 | B60J 1/02 |
| EP | 3196013 A1 | * | 7/2017 | B32B 17/10036 |
| FR | 2206289 A1 | * | 6/1974 | B32B 17/10036 |
| FR | 2534244 A | * | 4/1984 | B32B 17/10 |
| FR | 2676049 A1 | * | 11/1992 | B32B 17/10036 |
| GB | 1401497 A | | 7/1975 | |
| JP | 63147844 A | * | 6/1988 | |
| JP | 11011990 A | * | 1/1999 | B32B 17/10036 |
| JP | 2005001948 A | * | 1/2005 | B32B 17/1066 |
| JP | 2005029083 A | * | 2/2005 | B32B 17/10 |
| JP | 2006096331 A | * | 4/2006 | B32B 17/1066 |
| JP | 2008303084 A | * | 12/2008 | |
| JP | 2009298661 A | * | 12/2009 | |
| JP | 2015024929 A | * | 2/2015 | |
| JP | 2015196612 A | * | 11/2015 | B60K 35/00 |
| KR | 2009026592 A | * | 3/2009 | |
| KR | 2010000946 A | * | 1/2010 | |
| WO | WO-2004106056 A1 | * | 12/2004 | B32B 17/10036 |
| WO | WO-2006078147 A1 | * | 7/2006 | G06K 19/07749 |
| WO | WO-2007085599 A1 | * | 8/2007 | B32B 17/10018 |
| WO | 2007122427 A1 | | 11/2007 | |
| WO | WO-2007122427 A1 | * | 11/2007 | B32B 17/10174 |
| WO | WO-2009024278 A1 | * | 2/2009 | B32B 27/08 |
| WO | WO-2010119771 A1 | * | 10/2010 | B32B 17/10 |
| WO | 2017203133 A1 | | 11/2017 | |
| WO | 2018082920 A1 | | 5/2018 | |

OTHER PUBLICATIONS

Machine Translation of FR-2206289-A1, Jun. 1974 (Year: 1974).*
Machine Translation of DE-19519504-A1, Nov. 1996 (Year: 1996).*
Machine Translation of DE-102007039416-A1, Feb. 2009 (Year: 2009).*

* cited by examiner

INVISIBLE EDGE SOLID SUBSTRATE COMPENSATION LAYER FOR AUTOMOTIVE GLAZING

FIELD OF THE INVENTION

The invention relates to the field of laminated automotive glazings.

BACKGROUND OF THE INVENTION

Automotive vehicle glazing, which once served just to provide for vision and protection from the elements, has been taking on new functions as the complexity and functionality of modern automobiles has evolved in recent years. As an example, performance films, glass compositions, interlayers and coating are often used to add to and enhance the functionality of the vehicle glazing. These functions include but are not limited to: solar control, sound dampening, heads up display (HUD) and variable light transmittance.

Recent advances have made it possible to produce electronic circuits, on thin transparent substrates, that are essential invisible under normal lighting conditions. The circuits are produced by various methods known in the art and specific to the type of circuit and product being produced. Some examples include: sensors, LEDs, Organic Light Emitting Diode (OLED) and Electroluminescent displays. Circuits have been commercially produced on glass substrates having a thickness of 700 μm and less. At this thickness it becomes possible to incorporate the circuit as an insert into an automotive laminate.

Laminates that incorporate LED lighting have been known for many years. In some cases, the LEDs have been attached to a flexible plastic substrate which is subsequently inserted into the laminate during assembly of the layers of the laminate. Small electroluminescent displays, with areas in the one to two square decimeter range, have been produced on thin glass substrates and successfully laminated in bent glass windshields. Much larger OLED displays, on thin glass substrates have also been made. While OLED and electroluminescent displays can both be laminated, larger displays are limited to use on flat laminates as it is not possible to deposit the circuit on a curved substrate or to thermally bend the circuit and substrate after it has been deposited on the flat glass.

Displays, for use in bent glass laminates in particular, need to be limited in size, due to the problems presented by the curvature of the laminate in the area of the insert, the thickness of the interlayer and glass and the parameters of the lamination process used.

In addition to active circuits, the insert may also be comprised in all or in part by various passive components, coatings and compositions. Active components may be amplifying components such as transistors, triode vacuum tubes (valves), and tunnel diodes. Likewise, passive components include resistors, capacitors, inductors or transformers. An example is an insert comprising a thin flexible substrate with a coating designed to enhance a head up display.

A typical automotive laminate is comprised of two glass layers and a plastic interlayer, typically a thermoset plastic. The plastic interlayer serves to bond the opposite major faces of the glass layers to each other. To add a performance film to the laminate, the film is cut to shape and at least a second layer of plastic interlayer is added. The film is sandwiched between the two sheets of plastic interlayer which serve to bond each side of the film to each glass layer. The film typically extends near or to the edge of glass or at least to the inside of the black obscuration band where the edge of the film is hidden. This is due to the objectionable aesthetics and distortion that can occur at the interface between the edge of the film and the interlayer.

To laminate an insert, a second plastic interlayer is also used as with a film. The insert is sandwiched between the two plastic layers. If the insert is too thick however, a third plastic interlayer is needed. In this case, a cutout is made in the third plastic interlayer to accommodate the insert and the third plastic interlayer is placed between the two outermost plastic interlayers.

While this method can be used to successfully produce a laminate, the problem is that the insert is not large enough to have the edges hidden by the obscuration in most cases.

The edges of the insert are prone to objectionable aesthetics due to mismatch between its substrate and the plastic interlayer index of refraction, thickness and color. While the color of the plastic interlayer can be altered, the index of refraction cannot. Also, plastic interlayer is only available in a limited number of standard thicknesses.

It would be desirable to find a method that could overcome this limitation.

BRIEF SUMMARY OF THE INVENTION

The present invention aims to overcome the disadvantage of the state-of-art by providing a laminated glazing having an insert and a compensation layer made from a rigid transparent material, such that the mismatch between them goes unnoticed or is otherwise tolerated.

Thus, it is an objective of the present invention to provide a laminated glazing comprising an outer glass layer, an inner glass layer, at least two plastic interlayers located between outer and inner glass layers, at least one insert, and at least one compensation layer having a glass transition temperature above the temperature at which the at least two plastic interlayers melts in a lamination process, wherein the at least one compensation layer has at least one cutout area, wherein the at least one insert is placed into the at least one cutout area in the at least one compensation layer.

It is a further objective of the present invention to provide a compensation layer of a compatible compensation material which compensates for the color, thickness and index of refraction of the insert, wherein the compensation layer extends to at least the black band of the laminate. Optionally, the gap between the cutout in the compensation layer and the insert is filled with a laminating resin to further improve the aesthetics of the edge.

REFERENCE NUMERALS OF DRAWINGS

Figure 1A:
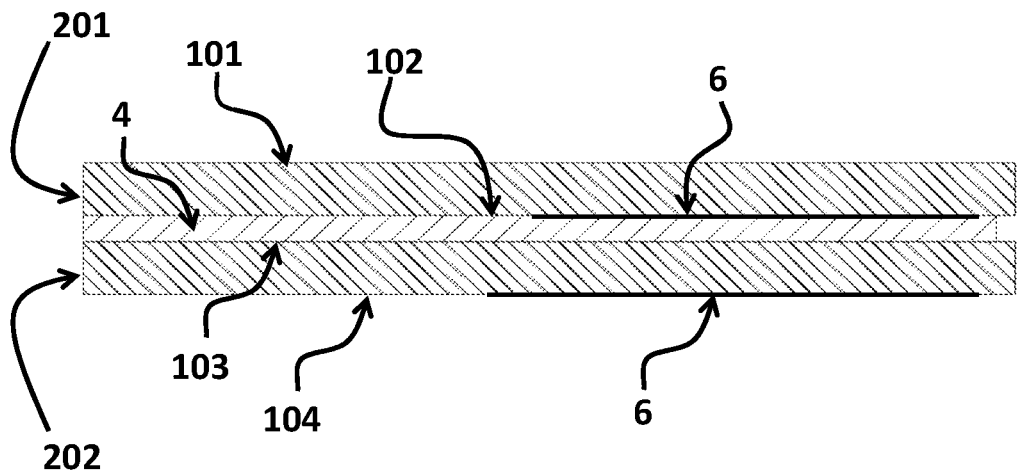
FIG. 1A shows the cross section of a typical automotive laminate

4 Plastic Interlayer
6 Obscuration
12 Compensation layer/sheet
18 Coating

34 Cutout
44 Insert
101 Surface one
102 Surface two
103 Surface three
104 Surface four
201 Outer glass layer
202 Inner glass layer

DETAILED DESCRIPTION OF THE INVENTION

Laminates, in general, are articles comprised of multiple sheets of thin, relative to their length and width, material, with each thin sheet having two oppositely disposed major faces, typically with each having relatively uniform thickness, which are permanently bonded to one and other across at least one major face of each sheet.

Figure 1B:
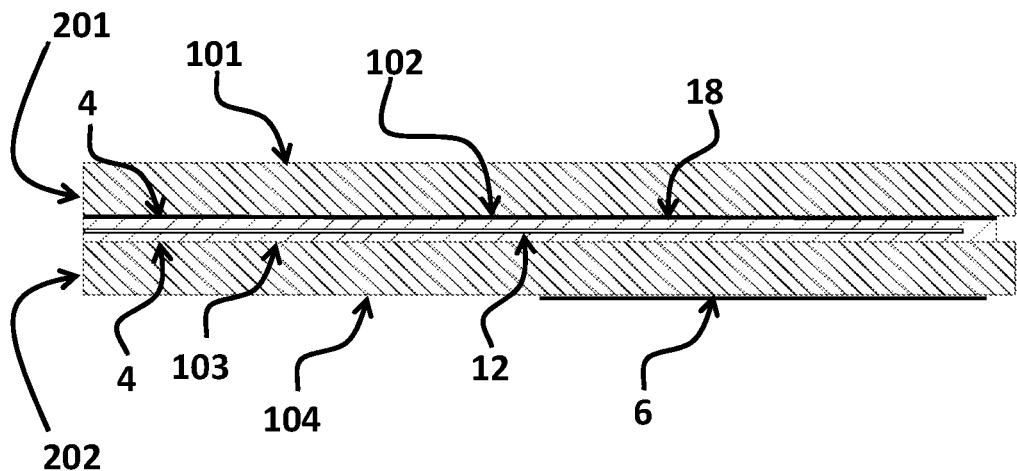
FIG. 1B shows the cross section of a typical automotive laminate with compensation layer and coating.

A typical automotive laminate cross section is illustrated in FIGS. 1A and 1B. In the embodiment illustrated, the laminate is comprised of two layers of glass the exterior or outer 201 and interior or inner 202 that are permanently bonded together by a plastic interlayer 4. The glass surface that is on the exterior of the vehicle is referred to as surface one 101 or the number one surface. The opposite face of the outer glass layer 201 is surface two 102 or the number two surface. The glass surface that is on the interior of the vehicle is referred to as surface four 104 or the number four surface. The opposite face of the inner glass layer 202 is surface three 103 or the number three surface. Surfaces two and three (102 & 103) are bonded together by the plastic interlayer 4. An obscuration 6 may be also applied to the glass. Obscuration are commonly comprised of black enamel frit printed on either the surface two 102 or surface four 104 or on both. The laminate may also comprise a coating 18 on one or more of the surfaces. The laminate may also comprise a compensation layer 12 laminated between at least two plastic interlayers 4.

The black frit print obscuration 6 on many automotive glazings serves both a functional and an aesthetic role. The substantially opaque black print on the glass serves to protect the polyurethane adhesive used to bond the glass to the vehicle from ultra-violet light and the degradation that it can cause. It also serves to hide the adhesive from view from the exterior of the vehicle. The black obscuration must be durable, lasting the life of the vehicle under all exposure and weather conditions. Part of the aesthetic requirement is that the black have a dark glossy appearance and a consistent appearance from part to part and over the time. A part produced today must match up with one that was produced and in service 20 years ago. The parts must also match up with the other parts in the vehicle which may not have been fabricated by the same manufacturer or with the same formulation of frit. Standard automotive black enamel inks (frits) have been developed that can meet these requirements.

Black enamel frit is comprised of pigments, carriers, binders and finely ground glass. Other materials are also sometimes added to enhance certain properties: for instance, the firing temperate, anti-stick, chemical resistance, etc. The black frit is applied to the glass using a silk screen or ink jet printing process prior to the heating and bending of the glass. As the flat glass is heated during the bending process, the powdered glass in the frit softens and melts, fusing to the surface of the glass. The black print becomes a permanent part of the glass. The frit is said to be "fired" when this takes place. This is a vitrification process which is very similar to the process used to apply enamel finishes on bathroom fixtures, pottery, china and appliances.

In case the glass layers are bent, glass layers are commonly formed using gravity bending, press bending, cold bending or any other conventional means known in the art. Gravity and press bending methods for forming glass are well known in the art and will not be discussed in the present disclosure.

Cold bending is a relatively new technology. As the name suggest, the glass is bent, while cold to its final shape, without the use of heat. On parts with minimal curvature a flat sheet of glass can be bent cold to the contour of the part. This is possible because as the thickness of glass decreases, the sheets become increasingly more flexible and can be bent without inducing stress levels high enough to significantly increase the long-term probability of breakage. Thin sheets of annealed soda-lime glass, in thicknesses of about 1 mm, can be bent to large radii cylindrical shapes (greater than 6 m). When the glass is chemically or heat strengthened the glass is able to endure much higher levels of stress and can be bent along both major axis. The process is primarily used to bend chemically tempered thin glass sheets (<=1 mm) to shape.

Cylindrical shapes can be formed with a radius in one direction of less than 4 meters. Shapes with compound bend, that is curvature in the direction of both principle axis can be formed with a radius of curvature in each direction of as small as approximately 8 meters. Of course, much depends upon the surface area of the parts and the types and thicknesses of the substrates.

The cold bent glass will remain in tension and tend to distort the shape of the bent layer that it is bonded to. Therefore, the bent layer must be compensated to offset the tension. For more complex shapes with a high level of curvature, the flat glass may need to be partially thermally bent prior to cold bending.

The glass to be cold bent is placed with a bent to shape layer and with a bonding layer placed between the glass to be cold bent and the bent glass layer. The assembly is placed in what is known as a vacuum bag. The vacuum bag is an airtight set of plastic sheets, enclosing the assembly and bonded together it the edges, which allows for the air to be evacuated from the assembly and which also applies pressure on the assembly forcing the layers into contact. The assembly, in the evacuated vacuum bag, is then heated to seal the assembly. The assembly is next placed into an autoclave which heats the assembly and applies high pressure. This completes the cold bending process as the flat glass at this point has conformed to the shape of the bent layer and is permanently affixed. The cold bending process is very similar to a standard vacuum bag/autoclave process, well known in the art, with the exception of having an unbent glass layer added to the stack of glass.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent. The glass layers may be comprised of heat absorbing glass compositions as well as infrared reflecting and other types of coatings.

Most of the glass used for containers and windows is soda-lime glass. Soda-lime glass is made from sodium carbonate (soda), lime (calcium carbonate), dolomite, silicon dioxide (silica), aluminum oxide (alumina), and small quantities of substances added to alter the color and other properties.

Borosilicate glass is a type of glass that contains boric oxide. It has a low coefficient of thermal expansion and a high resistance to corrosive chemical. It is commonly used to make light bulbs, laboratory glassware, and cooking utensils.

Aluminosilicate glass is make with aluminum oxide. It is even more resistant to chemicals than borosilicate glass and it can withstand higher temperatures. Chemically tempered Aluminosilicate glass is widely used for displays on smart phones and other electronic devices.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment. In the chemical tempering process, ions in and near the outside surface of the glass are exchanged with ions that are larger. This places the outer layer of glass in compression. Compressive strengths of up to 1,000 Mpa are possible.

Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic interlayer 4 also helps to prevent penetration by objects striking the laminate from the exterior and in the event of a crash occupant retention is improved.

The plastic interlayer has the primary function of bonding the major faces of adjacent layers to each other. The material selected is typically a clear thermoset plastic.

For automotive use, the most commonly used plastic interlayer is polyvinyl butyral (PVB). It is produced by the reaction between polyvinyl alcohol and n-butyraldehyde. PVB is clear and has high adhesion to glass. However, PVB by itself, it is too brittle. Plasticizers must be added to make the material flexible and to give it the ability to dissipate energy over a wide range over the temperature range required for an automobile. Only a small number of plasticizers are used. They are typically linear dicarboxylic esters. Two in common use are di-n-hexyl adipate and tetra-ethyleneglycol di-n-heptanoate.

In addition to polyvinyl butyl, ionoplast polymers, ethylene vinyl acetate (EVA), cast in place (CIP) liquid resin and thermoplastic polyurethane (TPU) can also be used. Automotive interlayers are made by an extrusion process with has a thickness tolerance and process variation. As a smooth surface tends to stick to the glass, making it difficult to position on the glass and to trap air, to facilitate the handling of the plastic sheet and the removal or air (deairing) from the laminate, the surface of the plastic is normally embossed contributing additional variation to the sheet. Standard thicknesses for automotive PVB interlayer at 0.38 mm and 0.76 mm (15 and 30 mil).

Automotive glazing often makes use of heat absorbing glass compositions to reduce the solar load on the vehicle. While a heat absorbing window can be very effective the glass will heat up and transfer energy to the passenger compartment through convective transfer and radiation. A more efficient method is to reflect the heat back to the atmosphere allowing the glass to stay cooler. This is done through the use of various infrared reflecting films and coatings. Infrared coatings and films are generally too soft to be mounted or applied to a glass surface exposed to the elements. Instead, they must be fabricated as one of the internal layers of a laminated product to prevent damage and degradation of the film or coating.

One of the big advantages of a laminated window over a tempered monolithic glazing is that a laminate can make use of infrared reflecting coatings and films in addition to heat absorbing compositions and interlayers.

Infrared reflecting coatings include but are not limited to the various metal/dielectric layered coatings applied though Magnetron Sputtered Vacuum Deposition (MSVD) as well as others known in the art that are applied via pyrolytic, spray, controlled vapor deposition (CVD), dip and other methods.

Infrared reflecting films include both metallic coated plastic substrates as well as organic based non-metallic optical films which reflect in the infrared. Most of the infrared reflecting films are comprised of a plastic film substrate having an infrared reflecting layered metallic coating applied.

To control the level of light transmission through the laminate, there are a number of technologies available: electrochromic, photochromic, thermochromic and electric field sensitive films which are designed to be incorporated into laminated glass. Of particular interest are suspended particle device (SPD) films and polymer dispensed liquid crystal (PDLC) films which can quickly change their light transmittance in response to an electrical field.

As mentioned, a wide variety of films are available that can be incorporated into a laminate. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics. The term "film" or "performance film" shall include all of these as well as other products that may be developed or which are currently available which enhance the performance, function, aesthetics or cost of a laminated glazing. Most films do not have adhesive properties. To incorporate into a laminate, sheets of plastic interlayer are needed on each side of the film so as to bond the film to the other layers of the laminate.

Other materials and devices may be incorporated into the structure of the safety laminate as inserts. A common insert is a temperature sensor, used to provide for closed loop control of a heated laminate. Another common insert is a resistive wire heating circuit comprising a set of busbars and fine wires.

An insert must be less than the thickness of the plastic interlayer in total, preferably no more than one third of the total thickness. During the lamination process, the laminate is treated with heat and pressure. The temperature in which the autoclave process is carried out is determined by the temperature in which the plastic interlayer melts. An ideal autoclave process temperature allows good adhesion between the layers bonded by the plastic interlayer. At higher temperatures and pressure, the plastic interlayer will melt and flow to accommodate the thickness of the insert. If the insert is too thick, a portion of the plastic must be removed or a thicker or additional interlayer must be added.

In the present invention, a compensation layer of a rigid transparent material is added to the laminate. A cutout with the size of the insert is cut in the compensation layer and the layer with the insert is sandwiched between the two plastic interlayer sheets. In this sense, the compensation layer is made of a material with a glass transition temperature above the temperature at which the autoclave process is carried out.

In addition, the compensation layer is preferably made of a compatible material. By compatible material is meant that both the substrate of the insert and the compensation layer are made from the same or similar material, such that a good match between these components index of refraction, thickness and color is achieved.

One of the keys to the invention is the accuracy with which the insert can be cut to size and with which the cutout in the larger compatible sheet can be cut. The preferred method is through the use of a LASER, among others. In one embodiment, a LASER is used to cut the opening in the compatible layer and also to cut the substrate for the insert. Methods for LASER cutting glass are known in the art. A nano second pulsed LASER or preferably a femto second pulsed LASER is used in conjunction with an optical means with provides a focal point that is at or below the exterior surface of the glass. As the glass is removed by the LASER the focus is adjusted or the LASER itself is moved to deepen the opening. In this manner the glass may be cut leaving an edge with low surface roughness. Surface roughness is important as it is a measure of the quality of the glass surface. The smoother the surfaces are, the less visible they will be in the finished laminate. A smoother surface also has fewer and less severe surface defects resulting in a lower probability of breakage.

The insert needs to be cut to slightly less than the cutout. Typical CNC tolerances of +/−100 μm are achievable allowing for gap between the insert and the cutout of less than 0.5 mm.

The gap will leave a visible parting line but with no difference in the index of refraction of thickness, it will be much less noticeable and objectionable. If even better aesthetics are required, the gap can be filled with an index of refraction matched UV cure laminating resin as acrylic resins or similar product for a true invisible edge.

Due to the typical thickness of the insert and compatible sheet, cold bending as previously described, may be an option depending up on the shape, material and other factors discussed. In addition, one or more of the glass layers may also be cold bent dependent upon these same factors.

DESCRIPTION OF EMBODIMENTS

Figure 2:
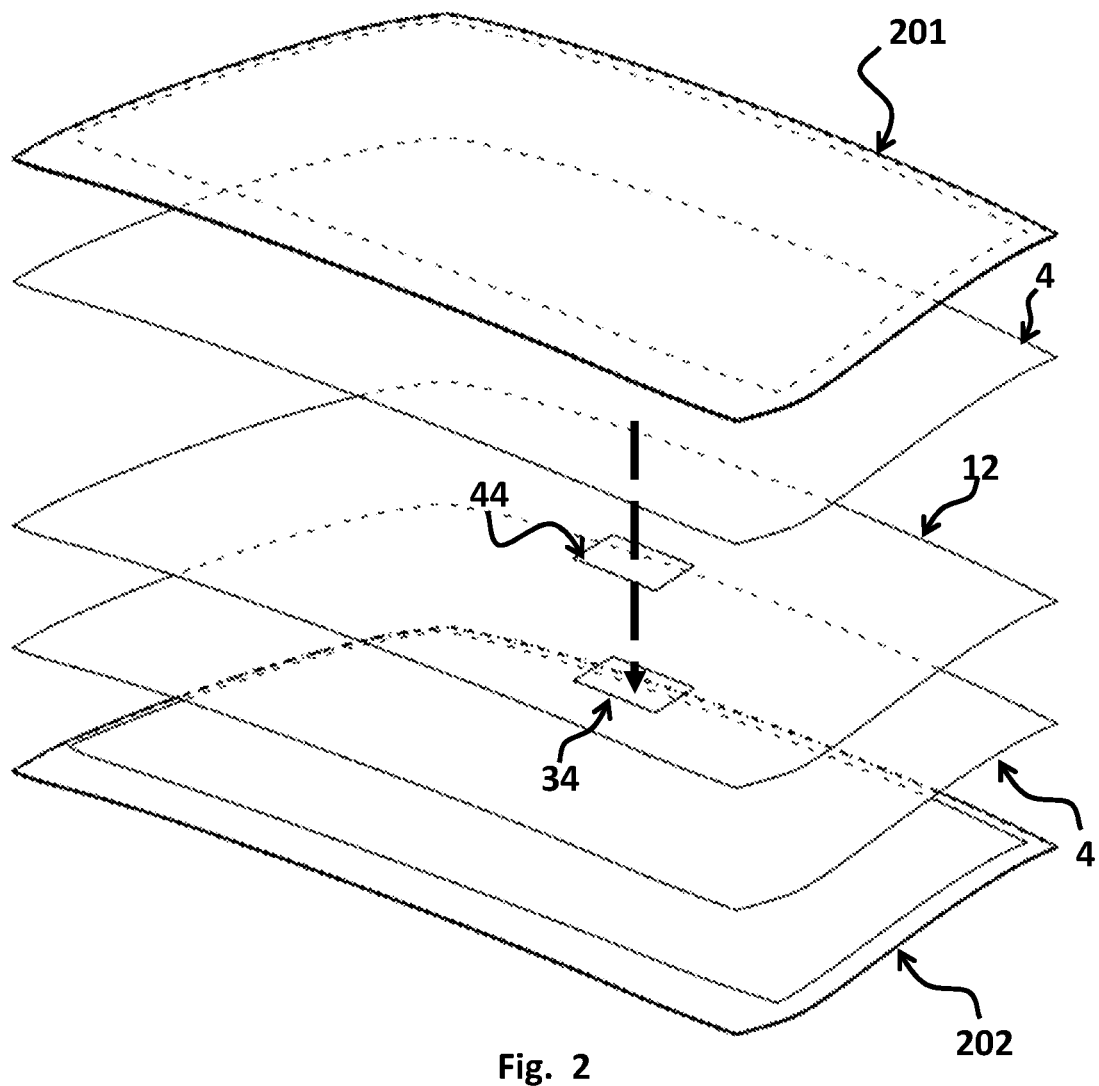
FIG. 2 shows the exploded view of a windshield exemplifying the laminate of the invention.

1. The windshield of FIG. 2 is comprised of two 2.1 mm gravity bent glass layers (201 & 202). The compensation layer 12 is bent with the glass layers. The insert 44 measures 150 mm×100 mm with 3 mm radius corners. The cutout 34 in the compensation layer 12 is sized 0.4 mm larger than the insert 44 on each side. The thickness of the insert 44 and the compensation layer 12 is 0.7 mm. The insert 44 contains an electroluminescent display deposited on a flat 0.7 mm soda-lime glass substrate. The compensation layer 12 is also 0.7 mm soda-lime glass. The flat insert 44 and the compensation layer 12 are sandwiched between two 0.76 mm layers of clear PVB interlayer 4.
2. The windshield of embodiment 1 further comprises a compensation layer 12 that is cold bent during the lamination process.
3. The windshield of embodiment 1 is produced in the same manner. The additional steps of applying a UV cure laminating resin to the gap between the insert 44 and the sheet, deairing the gap and curing the resin are performed.
4. The windshield of FIG. 2 is comprised of an outer glass layer 201 of 2.1 mm thickness and gravity bent glass layer. The insert 44 measures 150 mm×100 mm with 3 mm radius corners. The cutout 34 in the compensation layer 12 is sized 0.4 mm larger than the insert 44 on each side. The thickness of the insert 44 and the compensation layer 12 is 0.7 mm. The insert 44 contains an electroluminescent display deposited on a flat 0.7 mm soda-lime glass substrate. The compensation layer 12 is also 0.7 mm soda-lime glass. The flat insert 44 and compensation layer 12 are sandwiched between two 0.76 mm layers of clear PVB interlayer 4. The compensation layer 12 is cold bent. The inner glass layer 202 is 0.7 mm thick chemically tempered flat and also cold bent.
5. The windshield of embodiment 1 further comprising an infra-red reflecting coating 18 on the surface two 102.
6. The windshield of embodiment 4 further comprising an infra-red reflecting coating 18 on the surface two 102.
7. The windshield of embodiment 4 is produced in the same manner. The additional steps of applying a UV cure laminating resin to the gap between the insert 44 and the cutout 34 in the compensation layer 12, deairing the gap and curing the resin are performed.

In several embodiments in which the plastic interlayer corresponds to PVB, the autoclave process temperature is from about 100° C. to about 130° C. In a preferred embodiment, the autoclave process temperature is about 130° C.

In some embodiments, the compensation layer and/or the substrate of the insert are made of a rigid plastic material, such as polycarbonate.

In additional embodiments, the insert comprises at least one component selected from the group consisting of touch sensitive circuits, or sensors embedded, such as a rain sensor among others. The insert of the present invention can also be comprised by an OLED or LED laminated on curved or flat substrates.

On the other hand, in an embodiment of the laminate, the glass transition temperature of the at least one compensation layer is greater than 130° C.

It must be understood that this invention is not limited to the embodiments described and illustrated above. A person skilled in the art will understand that numerous variations and/or modifications can be carried out that do not depart from the spirit of the invention, which is only defined by the following claims.

What is claimed is:

1. An automotive laminate, comprising:
    an outer glass layer;
    an inner glass layer;
    two plastic interlayers located between the outer and inner glass layers;
    a single compensation layer consisting of a rigid transparent material made of glass or plastic, the compensation layer having a cutout area in a visible area of the laminate; and
    an insert comprising a substrate made of a compatible material that is similar to or the same as the material of the compensation layer, such that the substrate and compensation layer match in at least one of index of refraction, color, and thickness, and active or passive electronics;
    wherein the insert is placed into the cutout area in the single compensation layer;

wherein the single compensation layer and the insert are sandwiched between the two plastic interlayers and the single compensation layer is in contact with the two plastic interlayers; and;

wherein the single compensation layer has a glass transition temperature above an autoclave process temperature, wherein the autoclave process melts the two plastic interlayers.

2. The automotive laminate of claim 1, wherein the glass transition temperature of the compensation layer is above about 100° C.

3. The automotive laminate of claim 2, wherein the glass transition temperature of the compensation layer is above about 130° C.

4. The automotive laminate of claim 1, wherein the rigid transparent material is plastic.

5. The automotive laminate of claim 4, wherein the plastic material is polycarbonate.

6. The automotive laminate of claim 1, wherein the compatible material of the substrate is glass or plastic.

7. The automotive laminate of claim 6, wherein the rigid transparent material and the compatible material are the same material.

8. The automotive laminate of claim 1, wherein the compensation layer and the substrate match in at least two of index of refraction, thickness and color.

9. The automotive laminate of claim 1, wherein the active or passive electronics of the insert is selected from the group consisting of touch sensitive circuits, sensors, resistive heated circuits, rain sensors, OLED displays, LED displays and electroluminescent displays.

10. The automotive laminate of claim 1, wherein a gap is formed between the insert and the compensation layer, said gap being filled with a resin.

11. The automotive laminate of claim 10, wherein the gap is less than 0.5 mm.

12. The automotive laminate of claim 10, wherein the resin is a UV cure laminating resin.

13. The automotive laminate of claim 1, further comprising a black obscuration band.

14. The automotive laminate of claim 13, wherein the edges of the compensation layer are hidden inside of the black obscuration band.

15. The automotive laminate of claim 1, wherein the compensation layer is cold bent.

16. The automotive laminate of claim 1, further comprising an infra-red reflecting coating.

17. A windshield comprising the automotive laminate of claim 1.

* * * * *